United States Patent
Foster et al.

[15] 3,665,152
[45] May 23, 1972

[54] IRON WITH OVERTEMPERATURE PROTECTION MEANS

[72] Inventors: Harold S. Foster, Huntington Beach; Wendell C. Walker, Alta Loma, both of Calif.

[73] Assignee: General Electric Company

[22] Filed: May 20, 1971

[21] Appl. No.: 145,177

Related U.S. Application Data

[63] Continuation-in-part of Ser. No. 880,053, Nov. 26, 1969, abandoned.

[52] U.S. Cl. .............................................. 219/253, 219/517
[51] Int. Cl. ............................................................. D06f 75/26
[58] Field of Search ............... 219/251, 253, 517; 38/74, 82; 337/14, 15, 35, 404, 405, 407, 412, 416

[56] References Cited

UNITED STATES PATENTS

| | | | |
|---|---|---|---|
| 888,381 | 5/1908 | Andrews et al. | 219/517 X |
| 1,382,101 | 6/1921 | Lofts | 219/517 |
| 1,779,149 | 10/1930 | Tavender | 337/35 |
| 2,553,274 | 5/1951 | Pohl | 219/517 X |

Primary Examiner—C. L. Albritton
Attorney—Lawrence R. Kempton, John F. Cullen, Leonard J. Platt, Frank L. Neuhauser and Oscar B. Waddell

[57] ABSTRACT

A flatiron having an overtemperature protection means operating in conjunction with a thermostat to prevent an excessive soleplate temperature in the event of failure of the thermostat.

12 Claims, 6 Drawing Figures

Patented May 23, 1972 3,665,152
2 Sheets-Sheet 1
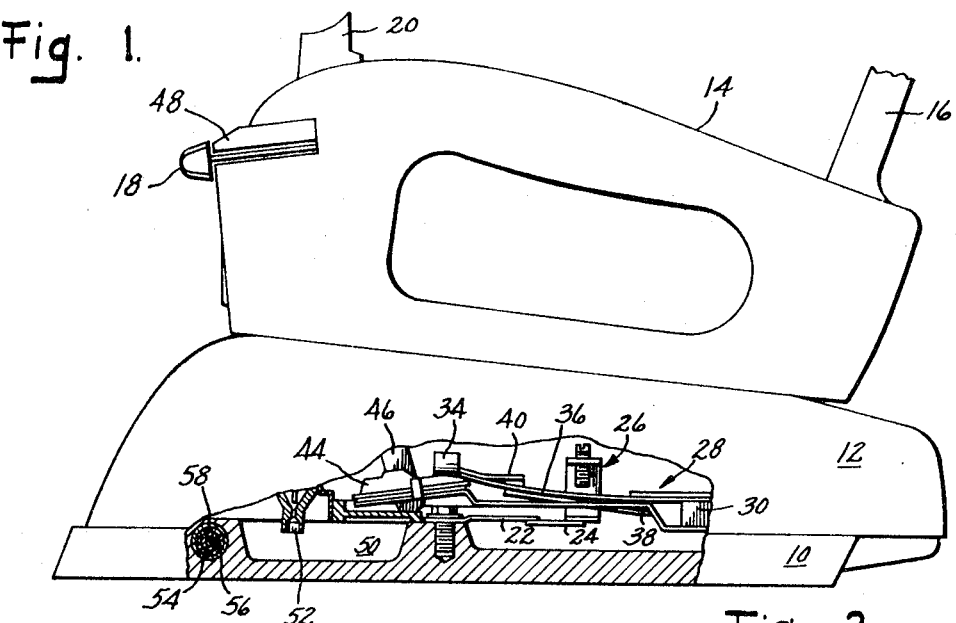
Fig. 1.
Fig. 2.
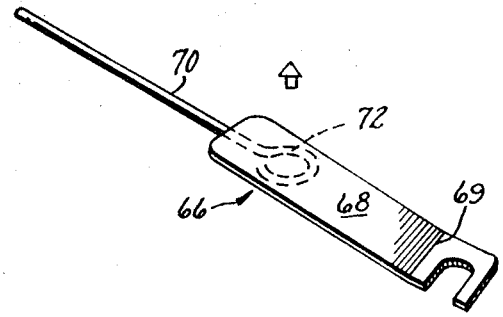
Fig. 3.
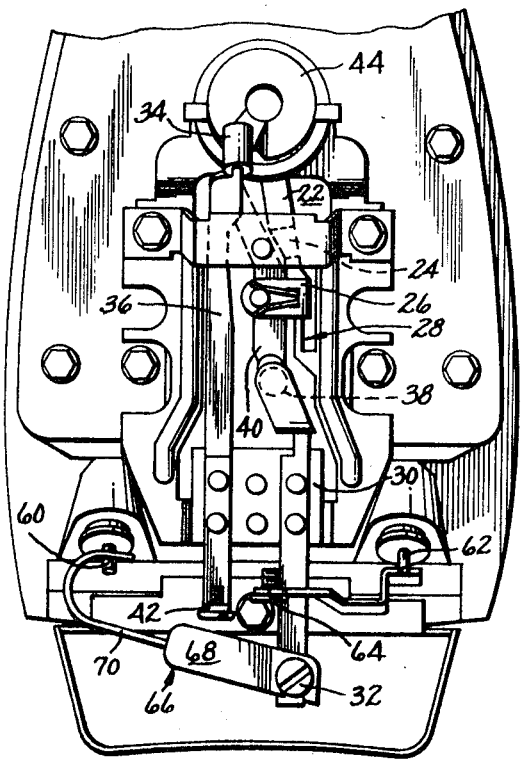
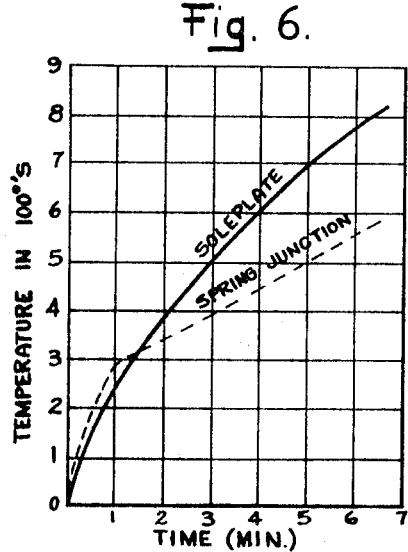
Fig. 6.
Inventors:
Harold S. Foster,
Wendell C. Walker.
by [signature] Attorney Patented May 23, 1972

Inventors:
Harold S. Foster,
Wendell C. Walker.
by
Julin F. Cullen
Attorney

IRON WITH OVERTEMPERATURE PROTECTION MEANS

This application is a continuation-in-part of application Ser. No. 880,053, filed Nov. 26, 1969, now abandoned.

BACKGROUND OF THE INVENTION

1. Field of the Invention

The invention herein pertains to an overtemperature control or protection means incorporated substantially in any type of electric flatiron to protect the soleplate from overheating in the event of any failure or inability of the thermostat to open the electrical circuit.

2. Description of the Prior Art

In irons of the various types available on the market today, such as conventional dry flatirons or irons with steam and/or spray features, a thermostat is used to open and close the circuit to the electric heater and thus control the temperature of the soleplate in accordance with selected temperatures for the various fabrics to be ironed. There is always a remote danger, although slight, of some failure upon which the thermostat cannot open the electrical circuit with the result that the iron may overheat. Typically, irons are made with aluminum soleplates that may be polished, coated with a non-stick surface or with stainless steel but the main body of the soleplate is aluminum. Consequently, the aluminum casting will have a melting point of around 1,220° F. although it will become dangerously hot and soften well before that temperature and start to melt between 900° and 1,100° F. Thus, it has generally been necessary to consider the maximum temperature of such irons as about 900° F.

Some prior art irons have used the equivalent of a fuse in the line in order to avoid overtemperature conditions, but this has not been satisfactory because of the extreme unreliability of the fuse and the inability of the designers to provide a device that could be mass produced with reliable repetition.

SUMMARY OF THE INVENTION

Briefly described, the present invention is directed to a flatiron which has an electrically heated soleplate of an alloy, such as aluminum, which softens and starts to melt in a temperature range of 900° F. to 1,100° F. Thermostatic means are provided for normally controlling the soleplate temperature with a maximum temperature in the order of about 550° F. To this conventional iron structure there is added an overtemperature protection means that comprises an electric circuit to the heating element and two circuit members in the circuit. At least one of the two circuit members is self-heating from current flow. Means are provided to transfer heat from the soleplate to the two circuit members and a eutectic sensor material is used to connect the two circuit members together mechanically, the material being selected so that it will not melt in its operating environment when the soleplate temperature is 600° F. or less and will melt in its operating environment before the soleplate temperature reaches 950° F. The circuit members are connected in a resilient manner so that they snap open and are sharply separated to break the electric circuit when the eutectic material melts. The circuit members are connected in series and one of them is formed of a spring member to provide the snap-action upon melting of the eutectic and thus a non-resetable breaker is provided. One of the circuit members is preferably of a wire form which is overlapped with the other circuit member and conveniently loop-connected at the overlap with substantial metal-to-metal electrical contact and firmly held by the eutectic material. The other is a spring member of higher resistance to current flow to provide supplemental heat and is preferably under tension and biased to provide the quick or sharp separation of the members when the eutectic melts. The wire-formed member may be bent into a loop to relieve stress on the thermostat and for ease of repetitive assembly to provide the overtemperature protection means reliably and efficiently for each iron in mass production. Thus, the main object is to provide a reliable overtemperature protection means to act in addition to the thermostat to disconnect the power supply and prevent excessive soleplate temperatures in all situations.

BRIEF DESCRIPTION OF THE DRAWINGS

FIG. 1 is an elevation view, partially in section, illustrating a typical iron to which the invention may be applied;

FIG. 2 is a partial cross-sectional view showing the overtemperature protection means and its location in the iron;

FIG. 3 is a perspective view of the members of the actual overtemperature protection means shown in FIG. 2;

FIG. 6 shows the relation between the overtemperature protection means and the soleplate during operation of the iron.

DESCRIPTION OF THE PREFERRED EMBODIMENT

Figure 4:
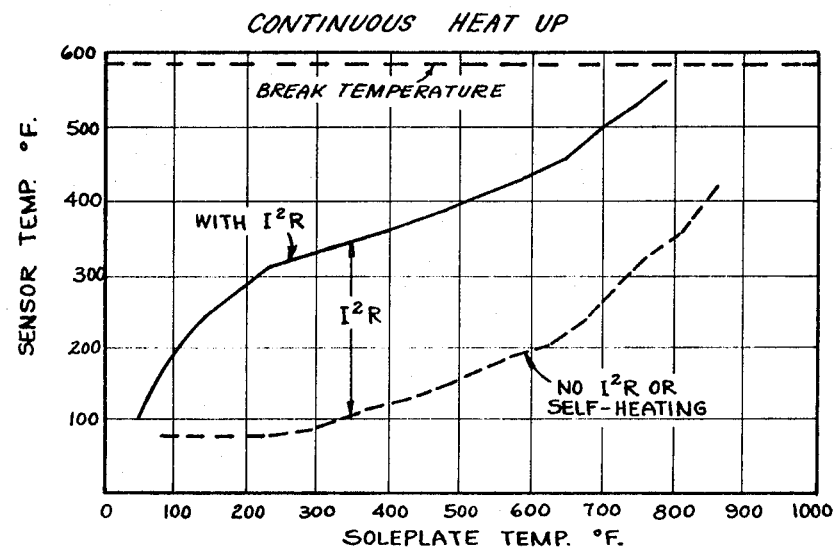
FIG. 4 shows two temperature effects on the overtemperature protection means as soleplate temperature is increased in a continuous heat-up condition.

Referring first to FIG. 1 there is shown a typical flatiron of the type to which this invention may be applied; although it should be apparent that the overtemperature control may be applied to any electric flatiron from the basic dry iron to various deluxe models having steaming, spraying, or other features. The iron includes a soleplate 10 that, typically and for the purpose of this description, is made of cast aluminum which melts when the soleplate temperature becomes abnormally high — in the range of 900° F. to 1,100° F. and will generally operate at a normal maximum continuous selected soleplate temperature in the order of e.g. 550° F. which is the normal maximum cycle temperature for a linen setting. Of course, this could vary with different irons. The normal thermostatic dial settings of an iron allow for a range of soleplate operating temperatures. Above this normal operating range, if the soleplate is subjected to a condition where the heat is generated faster than it is dissipated, an abnormally high soleplate temperature by definition, as used herein, will occur. A cover 12 encloses various components within the iron and an operating handle 14 molded from a thermal insulating material is suitably attached. Electric power is supplied to the iron through a conventional cord 16 that enters the iron through the handle in a well-known way. To adapt the iron for application to various fabrics, a temperature selector 18 may be provided near the top forward portion of handle 14 for convenience of operation. Also, the iron may be provided with a push button 20 which can be operated to convert the iron from dry to steam or vice versa.

Thermostatic switches for controlling the operating temperature of flatirons are well-known. A full description of the operation of a typical embodiment of the type shown may be found in the U.S. Pat. No. 3,188,757 of common assignment. Generally, a temperature responsive element or thermostat has a bimetallic blade 22 in heat conduction with the soleplate 10. The blade deforms downwardly on temperature increase of the soleplate and a shorter compensating blade 24 deflects upwardly on temperature increase to even out temperature variations while the iron heats up. Motion of the blade assembly is transmitted through an adjusting bracket assembly 26 to a switch assembly generally indicated at 28 which, in turn, is supported on an insulating block 30 and connected to a terminal screw 32 (FIG. 2) at the heel of the iron. A resilient arm 36, that is part of the switch assembly 28 is connected to the contact structure 38 through substantially rigid arm 40. The other end of arm 36 includes a terminal 42 to which one of the incoming electrical conductors may be secured. An insulator 34 overlies a temperature selection cam 44 that is rotatable by a shaft or connecting device 46 extending upwardly through the body of the iron in the front handle support for adjustment by selector knob 18. The temperature adjustment control mechanism is appropriately calibrated so that selector knob 18 may be moved from an "off" position to successive positions to adjust the thermostatic switch assembly just described to maintain progressively higher temperatures of the soleplate up to the highest operating temperature. Conventionally, a dial plate 48 cooperable with knob 18 may be calibrated with the names of different types of fabrics, commencing at the low temperature and with designations of various synthetics and continuing through rayon, wool, and cotton up to linen at the high temperature end of the scale.

The heating means for the soleplate which, in a steam iron has a steam generating cavity 50 into which water is dripped through orifice 52, is in the form of a sheathed tubular heater. Such a heater may be cast integrally into soleplate 10 and it has been found that aluminum or an aluminum alloy is particularly suitable for the soleplate casting in that such a metal is highly conductive of heat. Modern iron users require a light weight iron with very rapid heat-up characteristics. Typically an iron soleplate may have an area of no more than 30 square inches with an electric heater of 1,100 watts for an average wattage density of 36 – 37 watts per square inch. With a modern iron constructed with a heater in accordance with the above referenced U.S. Pat. No. 3,188,757, wattage densities as high as 60 watts per square inch may be used. Such high wattages applied to a small volume of aluminum can result in abnormally high soleplate temperatures, as previously noted, upon continuous operation of the heater and where the heat dissipation rate is limited, as when the iron is in a rest position. Thus, if the iron is on a high setting and, for some reason, the thermostat does not cycle or switch the electric power on and off to control and maintain a normal maximum ironing temperature, the iron will continuously heat up to the abnormally high temperatures. Consequently, the soleplate will soften and melt in the temperature range of 900° to 1,100° F.

The heating element itself comprises the coiled resistance wire 54 formed typically in a helix. This resistance wire is held in spaced relation within an outer protective sheath 56 by a mass of highly compact electrical insulating material 58 such as granulated magnesium oxide. At each end of the heater, the resistance wire is connected in any appropriate fashion to respective terminal pins 60 and 62 as seen in FIG. 2. Terminal pin 62 is connected to a terminal lug 64 for the other of the conductors of the electrical power supply. The other terminal pin 60 is connected through an overtemperature protection means generally indicated at 66 to the terminal screw 32 on one side of the switch. Thus, when the thermostatic switch is closed, electric current flows from terminal 64 through the resistance wire 54 to heat the iron, assembly 66, switch 28, and back to terminal 42 to the other side of the power supply line. The heating element of such an iron application, as mentioned, is in the neighborhood of 1,100 watts and in a steam iron it is preferable to mount the thermostat temperature sensing element in close proximity to the steam generating cavity 50 as shown and explained in the above referenced U.S. Pat. No. 3,188,757.

In accordance with the present invention, it is desired to provide an overtemperature protection means or assembly to protect the iron if, for any reason, the thermostat does not open or disconnect the electric circuit. Such failure can occur when loose parts accidentally dropped within the iron jam or short circuit the device, or it can occur by misuse of the iron wherein the calibration of the temperature selector 18 or adjusting bracket 26 is incorrect due to damage or from tampering with the calibration, or where the ceramic material of insulating member 34 or pieces of insulating block 30 may break off and jam the operation of the thermostat so the iron is in a continuous heating condition. Thermostat assembly 28 makes and breaks slowly and is designed for use only with alternating current. Inadvertent operation on direct current results in an arc when the contacts move toward the open position with consequent welding of the contacts in circuit closed condition. While it is an unusual and unexpected event when the overtemperature protection means may come into action, it is a safety feature that, in the form and combination disclosed herein, has not been available in irons to date to protect against such inadvertent high temperatures.

To thus protect the iron soleplate from overheating in the event of a malfunction, the overtemperature protection assembly means 66 as seen in FIG. 3 is disposed in the line between terminal pin 60 and one side of the switch so that it carries full line current. It will be apparent from the description thus far, that the assembly 66 receives and dissipates heat in its operating environment by conduction, radiation, and convection from the soleplate and surrounding parts by virtue of its location and connection with the terminal pin 60. For ease of description and since the soleplate is the prime source of heat, the assembly may be thought of as thus heated from the soleplate. In addition, of course, current flow in the circuit results in some self-heating of assembly 66 as will be further explained in an amount equal to the square of the current times its resistance or the I²R heating. The object of the protective assembly 66 is to provide a quick, clean, sharp break to disconnect the circuit at a soleplate temperature that is below a maximum permissible selected temperature.

The overtemperature protection means is far more than a current sensitive or heat sensitive component in the line as recognizing the conditions of operation will explain. If a thermostat malfunctions, e.g., jams in the on position and no longer cycles or switches on and off, the iron goes on continuous heat-up and gets hotter until the soleplate melts because heat is continuously generated faster than it is dissipated. Since the current remains the same, a current sensitive fuse is no protection. It is also possible to consider a heat sensitive device to detect high soleplate temperature and signal a shut down. A eutectic sensor directly on the soleplate as part of the electric circuit is unacceptable because the soleplate would be electrically hot. It is possible to electrically isolate the sensor so it receives heat in its environment by conduction, convection, and radiation and support it near but not on the soleplate with the result that there is a temperature lag or the sensor is always a little below soleplate temperature. Assembly 66 is constructed with two parts electrically isolated from the soleplate as shown in FIG. 3, i.e., a first resilient spring steel circuit member 68 and a second wire circuit member 70. Spring strip 68 is selected of predetermined size and is initially "set" to control its spring tension by deforming as shown at 69 at its end portion that is connected to one end of the switch at terminal screw 32. The flat form permits the spring strip to provide good radiation of heat as well as absorption and conduction. The flat strip is made of a material such as stainless steel which will internally generate heat because of its relatively high resistance to the passage of electric current. To complete the circuit, a wire 70 of, for example, manganese nickel because if its lower resistance, corrosion resistance, and ease of soldering, is connected to spring 68 whereupon strip 68 generates substantially all the internal heat in the assembly. Because of its inherent stability and low oxidation characteristics, stainless steel is preferred for spring strip 68. Other materials such as bronze or brass have poor characteristics at elevated temperatures, so stainless steel has been found preferable. In order to provide continuity to the electric circuit and good electrical connection, wire 70 is suitably formed as by a loop at one end to provide an area of good electrical contact with spring strip 68 and is joined or connected in overlapping current conducting relation at said one end and is then held in position by a eutectic alloy 72 which solders or bonds the two circuit members together. It is important to recognize that the eutectic is not an essential circuit element or in the main electrical path but a bond only. In other words, the contact between the relatively large area loop of wire 70 and strip 68 forms the electrical path before the eutectic is even applied and the eutectic is not a main or essential electric circuit element but forms a physical bond only to ensure the electrical relationship. Note that these two circuit members are secured together in the unstressed condition of FIG. 3. Subsequently, spring strip 68 is deflected and connected under terminal screw 32. Because of the angle from the bend at 69, there is a bending moment applied to the spring strip tending to separate the strip from wire 70.

Figure 5:
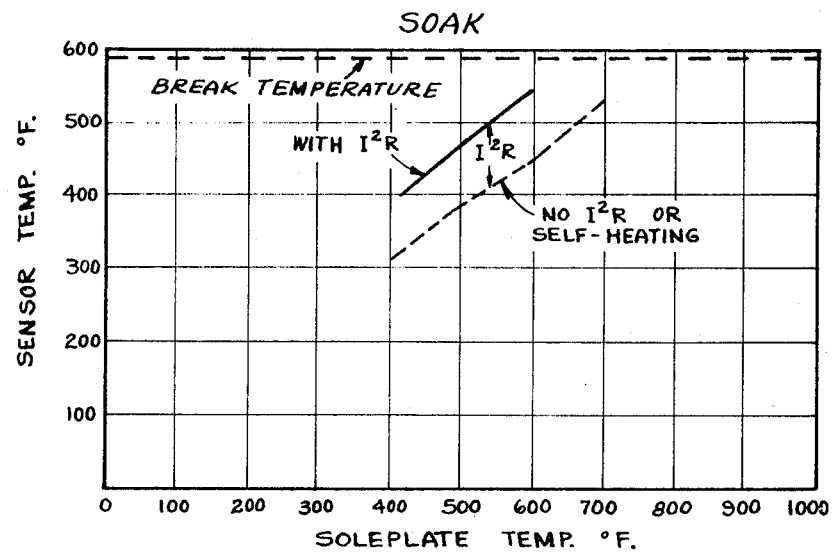
FIG. 5 shows two temperature effects, like FIG. 4, in a soak condition.

Referring now to FIG. 4, conditions of operation will be explained. The broken line shows the soleplate temperature versus the temperature at the junction of members 68 and 70 or at the eutectic sensor 72 under a continuous heat-up condition and omitting any self-heating due to current flow as later explained. The "break" line is a selected 588° F. temperature breakdown or melting point of the eutectic. It can be seen that there is a large lag between the soleplate and sensor temperatures and the lag increases nonlinearly or gets larger so, by extending the curve, it will be seen that the soleplate approaches a temperature of 1,000° F. before the broken line and "break temperature" lines cross and the sensor breaks or opens the circuit at 588° F. Of course, then the damage is done and the soleplate is melting. A 400° F. sensor to lower the break line would appear to solve the problem because FIG. 4 shows the soleplate temperature would be approximately 840° F. or below its melting point. However, there is another seemingly mutually exclusive condition to be considered and that is heating of the iron under soaking or continuous operation over an extended period under normal control of the thermostat. As an example, the iron may be set for, say, its maximum soleplate temperature of 550° F. for linen. After an extended time at rest at this fixed temperature, the iron components, soaking in the heated operating environment, all stabilize at some lower temperature depending on their locations in the iron and how much heat they absorb by conduction, convection and radiation. FIG. 5 shows a typical soak or continuous operation condition and it can be seen that, if the 400° F. sensor were used, it would break when the soleplate temperature is only 510° F. which is a normal operating temperature for the iron, and below top normal settable soleplate temperature of 500° F. Any lower sensor temperature is, of course, worse on the soak condition. If the sensor temperature is boosted to a 450° F. break temperature, FIG. 4 shows the soleplate temperature on the extended broken curve is up to 885° F. which is seemingly safe but undesirably close to the 900° F. maximum so is abnormally high as previously defined.

A safety margin of about 100° F. is normally built into irons to allow for thermostat drift as contacts wear or in case they stick momentarily or if someone unwisely tries to adjust the thermostat. Thus, a maximum settable soleplate temperature of 550° F. may jump momentarily to 650° F. and the iron must still be able to operate since it is well below the 900° F. limit. However, reference to the broken line of FIG. 5 shows the 450° F. sensor would not permit operation above 600° F. or 50° F. below the safety margin desired. These then are the difficult conditions which the overtemperature protection means must comply with over years of operation.

Thus, the problem is to provide a safe sensing means to follow the soleplate temperature closely with as little lag as possible in order to break the circuit promptly on a continuous FIG. 4 heat-up condition but not so closely that it will break the circuit (since it cannot be reset) under a soaking or normal ironing condition as in FIG. 5 and to do this with an overtemperature protection sensor means that is simple and uses few parts, is inexpensive, and can be made repetitively and, most important, is completely reliable. It will now be apparent that a fuse or heat sensor simply cannot meet these conditions.

The solution disclosed herein is to provide a supplemental designed-in increment of heat in the overtemperature protection means itself to get a quicker response and eliminate the lag described above in FIG. 4. However, as explained in connection with FIG. 5, the heat must not cut the iron out in normal operation. Thus, the invention selects the I²R heat of the overtemperature protection sensor means itself as the source of supplemental or an additional increment of heat to the circuit members and primarily to the sensor and this is selected in a range to meet the otherwise mutually exclusive conditions noted above. By using this heat in a boot strap-like manner, it is possible to avoid additional parts and, in effect, make the protection assembly itself generate the additional signal in the form of I²R heat that is then used by the assembly itself with the other environmental heat to enable it to function satisfactorily as an overtemperature protection device under the conditions indicated.

While the two-part assembly 66 is self-heating because of the current flow therethrough, it is designed to have one of the circuit members of higher resistance than the other to supply the additional increment of I²R heat as explained and this member is termed "self-heating." Because of the higher resistance of spring strip 68, it heats faster than wire 70 although the entire assembly is self-heating. It will be seen then that the circuit members 68 and 70 include at least one member which, as defined, is self-heating. This is spring 68 which is heated from the flow of line current in the heating circuit. Limited heat transfer means by the usual conduction, convection, and radiation from the soleplate to both the circuit members is provided by the connection of wire 70 to terminal 60 and by the location of the assembly in a heated space within the iron. The particular eutectic alloy 72 bonds the two circuit members in series and holds them in electrical conducting relationship and is one which will not melt in its operating environment in the iron below the normal maximum set operating temperature but will melt in the operating environment of any abnormally high temperature such as before the soleplate temperature reaches 950° F. In a practical embodiment, a eutectic has been used with a melting point of 588° F. as previously noted to achieve these objectives. As explained above, spring 68 is placed under tension or stress by the bend at 69 when secured under terminal screw 32 and is biased to separate from wire 70 when the eutectic melts. This bias is in the upper direction as shown by the arrow in FIG. 3 and away from wire 70 which, by being connected below the spring 68 permits spring 68 to snap away from wire 70 when no longer secured by the eutectic.

This assembly will even interrupt the circuit if direct current is inadvertently used, since the d-c arc will burn away the end of the steel strip 68 until the arc can no longer sustain itself. To complete the circuit, wire 70 is spot welded at one end to terminal pin 60 of the heater with the wire bent or deformed as by a loop as shown in FIG. 2 to relieve any tension that might otherwise be applied to the thermostat by connection at terminal screw 32. As previously noted, it is important that the overtemperature means or assembly 66 does not open the circuit merely as a current-operated fuse; but melting of the eutectic must depend predominantly upon soleplate temperature and secondarily on the increment of self-heating addition in the assembly itself from current flow.

Next it is necessary to determine what increment of I²R heating of the assembly itself must be secondarily supplied to achieve the desired results wherever the overtemperature protection means is placed in the iron. From the prior description, it will be apparent that first a plot must be made of the temperature of the sensor itself versus different soleplate temperatures when no self-heating is employed. Actually, this is accomplished by by-passing the sensor by connecting a wire directly from terminal pin 60 to terminal 42. The current then passes directly into terminal lug 64, through the heating element and out at pin 60 to terminal 42 and the other side of the line. The heat in assembly 66 is then due to conduction, convection, and radiation only and there is no self-heating. With outside controls, the soleplate temperature can then be varied at will and the broken line of FIG. 4 can be plotted. Similarly, the broken line of FIG. 5 is plotted for the soak condition. The desired break temperature line is then added to the graph and, in the example shown this is the 588° F. eutectic temperature selected. Next, it is necessary to generally parallel and raise these plots along the Y axis to make them overcome the previously described mutually exclusive conditions of operation. In other words, it is necessary to make the sensor temperature follow the soleplate temperature more closely and reduce the lag on continuous heat up but not too closely to break under soak conditions. Thus, the increment to be supplied is that which is insufficient to increase the temperature of the sensor to its melting point at the normal maximum operating temperature over either an extended time as in continuous heat-up or in the soak condition both under thermostat control. But the increment is sufficient to increase the sensor temperature to its selected — e.g., 588° F. — melting point and open the heater circuit if the thermostat does not operate before an abnormally high soleplate temperature. It will be seen therefore that the distance between the solid and broken curves is the additional secondary or supplementary incremental heat required and this can come from the assembly itself as $I^2R$ heat and the assembly is then designed to supply this heat as a supplement. Further, it has been found that the range of supplementary incremental heat to be added is 125° – 250° F. in the continuous heat-up and 75° – 90° F. in the soak condition. When the assembly 66 has been designed to generate this supplementary heat, confirmation in the form of the solid line or self-heating plot is determined by securing an additional wire to the sensor assembly, such as at terminal pin 60, and letting it project upwardly unconnected. It assumes the temperature of the assembly with the $I^2R$ heating and can be easily measured to provide the solid line plots. As a result then, the entire curves have been raised by the desired amount due to the addition of supplementary $I^2R$ heat which is generated in the desired amount within the very assembly itself.

Referring next to FIG. 6, typical operating characteristics are shown for a practical embodiment of the invention as finalized where the soleplate temperature of an actual iron is plotted in comparison with the improved overtemperature assembly spring-wire junction to show the relation between the two. As previously explained, the over-temperature sensor control must follow the soleplate temperature closely enough that the overtemperature cutout protects the iron and the user from excessive temperature on either continuous heat up or soak condition. It will be apparent that, initially, the overtemperature assembly heats up faster because of its own built-in self-heating and lower heat sink characteristics, than does the soleplate and that the temperatures of the two, after about a minute and a half, reach the same point after which the soleplate continues to heat to higher temperatures than the overtemperature assembly. On these curves as shown, the overtemperature protection means actually melted after about 6½ minutes when it reached 588° F. or when the soleplate temperature was approximately 810° F. as seen in FIG. 6 or well within the range of protection desired.

Reliable operation of this assembly is also dependent upon selection and use of a suitable alloy made up of different metals with proportions selected for eutectic composition to give the lowest desired melting point. Such an alloy retains most of its strength up to a temperature essentially equal to the melting point, thereby providing a reliable release point, even over a long period of time. For example, one alloy found useful for this purpose is made up of 1.5 percent silver, 1 percent tin, 97.5 percent lead and less than 0.4 percent antimony as set forth by specification ASTM–02, which eutectic alloy has a melting point at 588° F.

Of course, being a safety device, the overtemperature protection means, once melted, can be replaced only by repair at a suitable service shop since it is intentionally not self resetting. This additional protective device to conventional irons in the form shown, ensures against melting aluminum soleplates, or against dangerously high temperatures with soleplates made of iron, steel, or other high melting point materials.

While there has been described a preferred form of the invention, obvious equivalent variations are possible in light of the above teachings. It is therefore to be understood that within the scope of the appended claims the invention may be practised, otherwise then as specifically described, and the claims are intended to cover such equivalent variations.

We claim:

1. In an electric flatiron with a soleplate and an associated electric heater circuit of sufficient wattage to achieve abnormally high soleplate temperatures upon continuous heater operation, a thermostat limiting soleplate temperature to a normal maximum selected operating temperature by switching of the electric power supply to the electric heater, that improvement comprising,
   an overtemperature protection assembly to disconnect said electric heater from electric power before abnormally high soleplate temperatures occur in the event of any failure of the thermostat to switch off the power, said assembly comprising:
   first and second circuit members in electrical conducting relationship and in said electric heater circuit while being electrically isolated from said soleplate;
   an alloy sensor having essentially eutectic composition and a melting point at least as high as said normal maximum temperature and less than any abnormally high temperature, with said alloy physically maintaining said first and second circuit members in electrical conducting relationship without being an essential electric circuit element;
   means providing a bias to separate said circuit members when said alloy melts; means to heat said circuit members and said alloy sensor by limited heat transfer from said soleplate resulting in an alloy temperature below soleplate temperature during normal operation at the maximum normal operating temperature; and
   electric resistance means including at least one of said circuit members through which heater current flows to supply an additional increment of heat to said alloy sensor, said increment being insufficient to increase the temperature of said alloy sensor to its melting point at normal maximum operating temperature over an extended time under thermostat control, and sufficient to increase alloy sensor temperature to its selected melting point and open the heater circuit if said thermostat does not open the circuit before an abnormally high soleplate temperature occurs.

2. Apparatus as described in claim 1 wherein said normal maximum temperature is around 550° F.

3. Apparatus as described in claim 2 having resilient means in said circuit members to separate said members and break said circuit prior to a 950° F. soleplate temperature.

4. Apparatus as described in claim 2 wherein said circuit members are connected in series with one another and at least one of said circuit members has an electrical resistance to substantially generate the increment of heat by the current flow to said heater.

5. Apparatus as described in claim 4 wherein one of said circuit members is formed of a spring member.

6. Apparatus as described in claim 4 wherein said heat generating circuit member is said spring member.

7. Apparatus as described in claim 4 wherein the other circuit member is a wire connected to said heating element.

8. Apparatus as described in claim 5 wherein said spring member is connected to said thermostat.

9. Apparatus as described in claim 5 wherein said resistance spring member and wire are partially overlapping and are loop-connected at the overlap by said alloy.

10. Apparatus as described in claim 9 wherein said spring member is flat and is under tension and biased to separate sharply from said wire when said alloy melts.

11. Apparatus as described in claim 10 wherein said wire is also formed in a loop between said spring and said heating member.

12. In an electric flatiron with a soleplate and an associated electric heater circuit with a heater member in the soleplate and thermostat means for normally controlling the soleplate to a normal maximum selected operating temperature, an overtemperature protection assembly comprising;
   two circuit members in the electric circuit in electrical conducting relationship with each other,
   eutectic sensor means bonding said members together to ensure said electrical relationship,
   said eutectic being a material not meltable in its operating environment with a soleplate temperature at or below its normal maximum operating temperature and meltable in its operating environment prior to soleplate melting temperature, said circuit members being electrically isolated from said soleplate and positioned in the iron to receive heat in said environment by conduction, convection, and radiation, at least one of said members being self-heating to provide supplemental I²R heat to increase the temperature of said sensor so that a curve of sensor versus soleplate temperature under no self-heat conditions is raised by a range of 125° – 250° F. during a condition of continuous heat up and by a range of 75° – 90° F. in a soak condition of the iron whereby the sensor temperature more closely follows the soleplate temperature and protects the iron from overtemperature conditions, and means to separate said members upon melting of the eutectic.

* * * * *